Aug. 20, 1957 W. F. WILCOX 2,803,282
AUTOMOBILE CURTAIN
Filed July 26, 1955

INVENTOR.
WILVEN F. WILCOX
BY
McMorrow, Berman & Davidson
ATTORNEYS

United States Patent Office 2,803,282
Patented Aug. 20, 1957

2,803,282

AUTOMOBILE CURTAIN

Wilven F. Wilcox, Detroit, Mich.

Application July 26, 1955, Serial No. 524,352

2 Claims. (Cl. 150—52)

This invention relates to automobile covers, and more particularly to an improved automobile curtain device adapted to be placed on the roof of an automobile and adapted to cover the windows of the automobile to insure privacy for the occupants.

A main object of the invention is to provide a novel and improved automobile curtain device which is simple in construction, which is easy to install on an automobile, and which provides complete privacy for the occupants of the automobile, for example, where the automobile is provided with beds, or where the automobile is employed as a dressing room.

A further object of the invention is to provide an improved curtain device for an automobile, said curtain device being inexpensive to manufacture, being durable in construction, being light in weight, and being foldable to a compact size for convenient storage in the automobile when not in use.

Further objects and advantages of the invention will become apparent from the following description and claims, and from the accompanying drawings, wherein:

Figure 1:
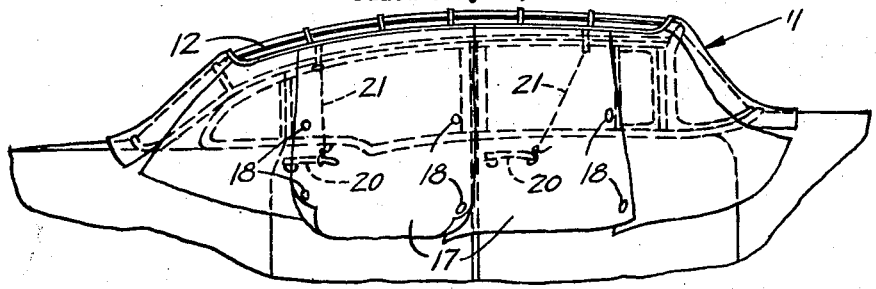
Figure 1 is a fragmentary view of the upper portion of an automobile on which is disposed an improved cover or curtain device according to the present invention.

Referring to the drawings, and more particularly to Figures 1, 2 and 3, 11 generally designates an automobile curtain device, said curtain device comprising intermediate flexible supporting means 12 adapted to be disposed on the roof of an automobile, said supporting means comprising a flexible mesh-like body consisting of spaced longitudinal flexible strap members 13, spaced transverse flexible strap members 14 superimposed on the longitudinal strap members 13, and a peripheral flexible strap member 15 connected to the ends of the longitudinal and transverse strap members 13 and 14 to define the aforesaid mesh-like body. The mesh-like body is substantially the same shape and size as an automobile roof and is adapted to be disposed on such roof inwardly of the top marginal portions of the automobile windows and windshield, as shown in Figure 1.

Secured to the flexible peripheral strap member 15 are a plurality of depending flexible flaps 17, said flaps being secured to the peripheral strap member 15 around its entire length and overlapping at their side margins, the overlapping portions of the flaps being provided with interengaging, detachable fasteners 18, so that the flap members 17 may be detachably fastened to each other at their side margins, if so desired.

Figure 2:
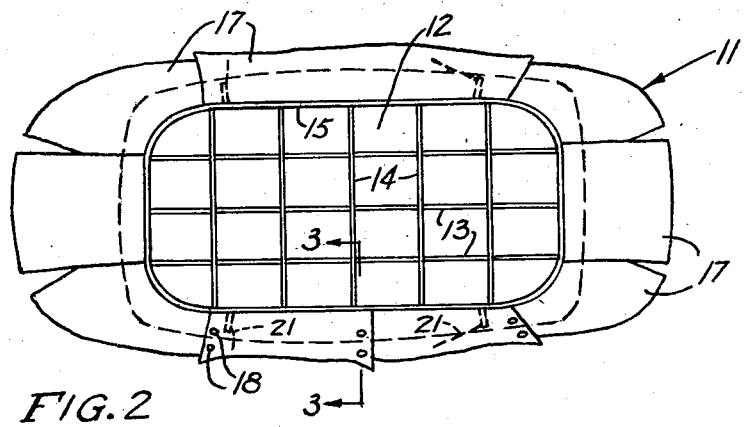
Figure 2 is a top view of the curtain device of Figure 1.

Secured to the peripheral band member 15 at locations adjacent the respective handles 20 of the automobile are respective flexible cable members 21, said cable members 21 being located inside the flap members 17, as shown in Figures 1 and 2, the flexible cable members 21 being of sufficient length to be tied to or otherwise suitably attached to the door handles 20 to anchor the curtain device in its intended position on the automobile roof.

The flap members 17 may be of any suitable flexible sheet material, such as canvas, sheet plastic, or the like. The flap members 17 are of sufficient length to completely cover the automobile windows and the automobile windshield, as shown in Figure 1.

Figures 3, 4:
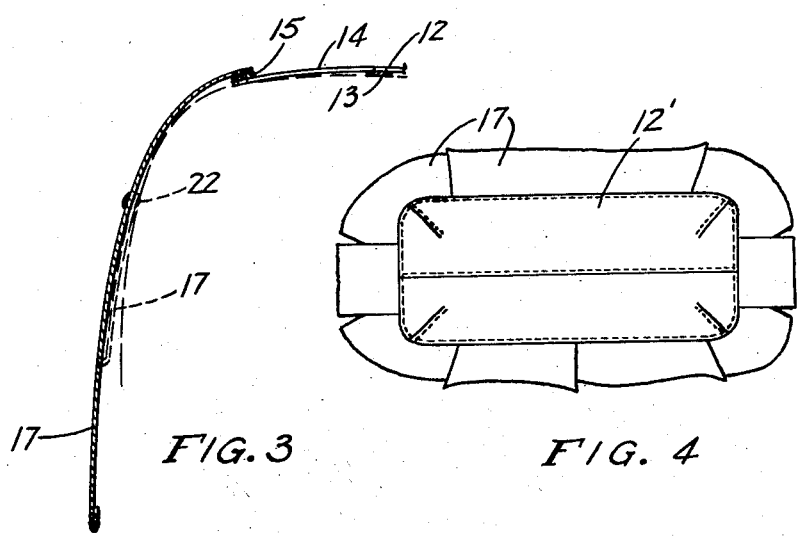
Figure 3 is an enlarged vertical cross sectional view taken on the line 3—3 of Figure 2.
Figure 4 is a top view, to a smaller scale than in the previous figures, of a modified form of automobile curtain device according to this invention.

The flap members may be folded inwardly and may be fastened at their inside upper portions, by the provision of suitable detachable fastening elements at 22 in Figure 3, so that the flap members may be arranged so as to only partially cover or completely expose a window of the automobile, if so desired.

In the form of the invention shown in Figure 4, the intermediate flexible supporting means of the curtain device, shown at 12', comprises a body of flexible sheet material shaped to overlie an automobile roof inwardly of the top margins of its windows, as in the case of the flexible support means 12 in Figures 1, 2 and 3, the flap members 17 being fastened to the margins of the flexible sheet-like body 12' around the entire periphery of said member 12'. As in the previously described form of the invention, the flap members 17 may be provided at their overlapping marginal portions with detachable interengaging fastening means so that the flap members may be detachably connected together at their side marginal portions, if so desired.

While certain specific embodiments of an improved automobile curtain device have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An automobile curtain device comprising a flexible mesh-like body comprising spaced longitudinal flexible strap members, spaced transverse flexible strap members supperimposed on said longitudinal strap members, and a peripheral flexible strap member connected to the ends of said longitudinal and transverse strap members, said mesh-like body being substantially the same shape and size of an automobile roof and being adapted to be disposed on such roof inwardly of the top marginal portions of the automobile windows and windshield, a plurality of independent depending flexible flaps secured to the peripheral strap member and extending around substantially the entire length of said peripheral strap member, said flaps overlapping each other at their side marginal portions and being of a length sufficient to substantially cover the windows of the automobile, interengaging fastening means on the overlapping portions of said flaps, respective flexible cable members connected to spaced portions of said peripheral strap member, and means for securing said cable members to portions of the automobile.

2. An automobile curtain device comprising a flexible mesh-like body comprising spaced longitudinal flexible strap members, spaced transverse flexible strap members supperimposed on said longitudinal strap members, a peripheral flexible strap member connecting the ends of said longitudinal and transverse strap members, said mesh-like body being substantially the same size and shape as an automobile roof and being adapted to be disposed on such roof inwardly of the top marginal portions of the automobile windows and windshield, and a plurality of depending independent flexible flaps secured to the peripheral strap member and extending around substantially the entire length of said peripheral strap member, said flaps being of a length sufficient to substantially cover the windows of the automobile.

References Cited in the file of this patent

UNITED STATES PATENTS

| | | |
|---|---|---|
| 1,472,651 | Holling | Oct. 30, 1923 |
| 1,559,458 | Rizianu | Oct. 27, 1925 |
| 1,715,286 | Hardy | May 28, 1929 |
| 1,728,437 | Mott | Sept. 17, 1929 |
| 1,770,841 | Clyman | July 15, 1930 |
| 1,905,973 | Levine | Apr. 25, 1933 |
| 2,608,942 | Smith | Sept. 2, 1952 |
| 2,718,912 | Zimmerman | Sept. 27, 1955 |